United States Patent
Lin et al.

(10) Patent No.: US 9,606,427 B2
(45) Date of Patent: Mar. 28, 2017

(54) LIGHT SOURCE MODULE WITH LIGHT COMBINING SYSTEM, FANS AND DUCTS

(71) Applicants: Tsung-Ching Lin, Hsin-Chu (TW); Kai-Lun Hou, Hsin-Chu (TW); Te-Tang Chen, Hsin-Chu (TW)

(72) Inventors: Tsung-Ching Lin, Hsin-Chu (TW); Kai-Lun Hou, Hsin-Chu (TW); Te-Tang Chen, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 59 days.

(21) Appl. No.: 14/731,412

(22) Filed: Jun. 5, 2015

(65) Prior Publication Data
US 2016/0018723 A1    Jan. 21, 2016

(30) Foreign Application Priority Data
Jul. 15, 2014  (CN) .......................... 2014 1 0334724

(51) Int. Cl.
G03B 21/16    (2006.01)
G03B 21/20    (2006.01)

(52) U.S. Cl.
CPC ......... *G03B 21/16* (2013.01); *G03B 21/2013* (2013.01)

(58) Field of Classification Search
CPC ........................... G03B 21/16; G03B 21/2013
USPC ........................................ 353/57, 58, 59, 60
See application file for complete search history.

(56) References Cited

U.S. PATENT DOCUMENTS

| 7,384,151 | B2* | 6/2008 | Seki | G03B 21/16 353/31 |
| 7,824,038 | B2* | 11/2010 | Yun | H05B 41/2928 348/745 |
| 7,901,085 | B2* | 3/2011 | Chen | G03B 21/16 353/61 |
| 8,807,760 | B2* | 8/2014 | Kanno | G03B 21/16 165/104.33 |

(Continued)

FOREIGN PATENT DOCUMENTS

| CN | 2634507 | 8/2004 |
| CN | 101101439 | 1/2008 |

(Continued)

OTHER PUBLICATIONS

"Office Action of China Counterpart Application", issued on Sep. 1, 2016, p. 1-p. 8.

*Primary Examiner* — Robert May
(74) *Attorney, Agent, or Firm* — Jianq Chyun IP Office

(57) ABSTRACT

A light source module adapted to a projector includes a light source, a light combining system, a first cooling fan, a second cooling fan, a first guide duct and a second guide duct. The light source includes a first light emitting device and a second light emitting device. The light combining system is disposed between the first light emitting device and the second light emitting device. The first cooling fan is disposed on the first light emitting device. The second cooling fan is disposed on the second light emitting device. The first guide duct is connected to the first cooling fan and guides a cooling airflow provided by the first cooling fan to the second light emitting device. The second guide duct is connected to the second cooling fan and guides a cooling airflow provided by the second cooling fan to the first light emitting device.

10 Claims, 2 Drawing Sheets

(56) References Cited

U.S. PATENT DOCUMENTS

| | | |
|---|---|---|
| 2006/0227555 A1 | 10/2006 | Nishimura et al. |
| 2008/0231812 A1 | 9/2008 | Sakai et al. |
| 2012/0050695 A1* | 3/2012 | Noda .................... G03B 21/16 353/61 |
| 2012/0154761 A1 | 6/2012 | Lin et al. |

FOREIGN PATENT DOCUMENTS

| | | |
|---|---|---|
| CN | 101271265 | 9/2008 |
| CN | 101639614 | 2/2010 |
| CN | 102540674 | 7/2012 |
| CN | 202522834 | 11/2012 |
| JP | 2013218101 A * | 10/2013 |

* cited by examiner

LIGHT SOURCE MODULE WITH LIGHT COMBINING SYSTEM, FANS AND DUCTS

CROSS-REFERENCE TO RELATED APPLICATION

This application claims the priority benefit of Chinese application serial no. 201410334724.X, filed on Jul. 15, 2014. The entirety of the above-mentioned patent application is hereby incorporated by reference herein and made a part of this specification.

BACKGROUND

Technical Field

The invention relates to a light source module, and particularly relates to a light source module adapted to a projector.

Related Art

A projector is a display device capable of producing images at anytime anywhere. An imaging principle of the projector is to convert an illumination beam produced by a light source into an image beam via a light valve, and the image beam is projected onto a screen or a wall through a lens to form an image. With progressing of projection technique and reduction of manufacturing cost, use of the projector has gradually expanded from commercial use to domestic use.

Generally, the projector has a light source module for providing light beams required for image projection. In order to satisfy a demand on high brightness of the projector, some projectors are installed with a plurality of light emitting devices in order to improve a light intensity of the light source module, and when number of the light emitting devices of the projector is increased, the number of cooling fans is also increased in order to respectively cool down the light emitting devices. Under restriction of a limited configuration space of the light source module in the projector, a guide duct of each cooling fan is required to be over bended in order to guide a cooling airflow to each of the light emitting devices. However, a flow rate of the cooling airflow has a loss due to the over bending, and a heat dissipation rate is accordingly decreased due to such design. On the other hand, if the air output of the cooling fan is increased in order to solve the above problem, the cooling fans may produce excessive noise to bother the user during the operation.

China Patent Publication No. CN102540674 discloses a projection apparatus, in which two fans are used to dissipate heat of a single lamp. The heat inside the lamp is concentrated at a top side of the lamp, and airflow intensities of the two fans can be adjusted, such that the intensity of the airflow at the top side of the lamp is higher than that of the airflow at a bottom side of the lamp, by which a temperature difference between the top side and the bottom side of the lamp is decreased. China Utility Model Patent No. CN202522834 discloses a cooling device of a projector, in which two fans are used to dissipate heat of a single bulb. The heat is concentrated at a high temperature section above a lighting tube of the bulb, and a flow rate of the fan corresponding to the high temperature section can be adjusted to a larger value. U.S. Patent Publication No. US20080231812 discloses an image projecting section having two light source devices, where heat of each light source is dissipated by two fans.

The information disclosed in this BACKGROUND OF THE INVENTION section is only for enhancement of understanding of the BACKGROUND OF THE INVENTION section of the described technology and therefore it may contain information that does not form the prior art that is already known to a person of ordinary skill in the art. Further, the information disclosed in the BACKGROUND OF THE INVENTION section does not mean that one or more problems to be resolved by one or more embodiments of the invention was acknowledged by a person of ordinary skill in the art.

SUMMARY

The invention is directed to a light source module, which is provided with dual light sources and has good cooling efficiency.

Other objects and advantages of the invention can be further illustrated by the technical features broadly embodied and described as follows.

In order to achieve one or a part of or all of the objects or other objects, an embodiment of the invention provides a light source module, which is adapted to a projector. The light source module includes a light source, a light combining system, a first cooling fan, a second cooling fan, a first guide duct and a second guide duct. The light source includes a first light emitting device and a second light emitting device. The light combining system is disposed between the first light emitting device and the second light emitting device. The first cooling fan is disposed on the first light emitting device. The second cooling fan is disposed on the second light emitting device. The first guide duct is connected to the first cooling fan and guides a cooling airflow provided by the first cooling fan to the second light emitting device. The second guide duct is connected to the second cooling fan and guides a cooling airflow provided by the second cooling fan to the first light emitting device.

According to the above descriptions, the embodiment of the invention has at least one of the following advantages. In the embodiment of the invention, the first cooling fan is disposed on the first light emitting device and the first cooling fan is used to dissipate heat of the second light emitting device. The second cooling fan is disposed on the second light emitting device and the second cooling fan is used to dissipate heat of the first light emitting device. In this way, in case that the first light emitting device and the second light emitting device are disposed opposite to each other, the first guide duct connected to the first cooling fan is capable of guiding the cooling airflow provided by the first cooling fan to the second light emitting device via a relatively small bending degree, and the second guide duct connected to the second cooling fan is capable of guiding the cooling airflow provided by the second cooling fan to the first light emitting device via a relatively small bending degree. Thus, loss of a flow rate of the cooling airflow due to over bending is decreased, so as to improve heat dissipation capability of the light source module.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings

DETAILED DESCRIPTION OF DISCLOSED EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to." Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
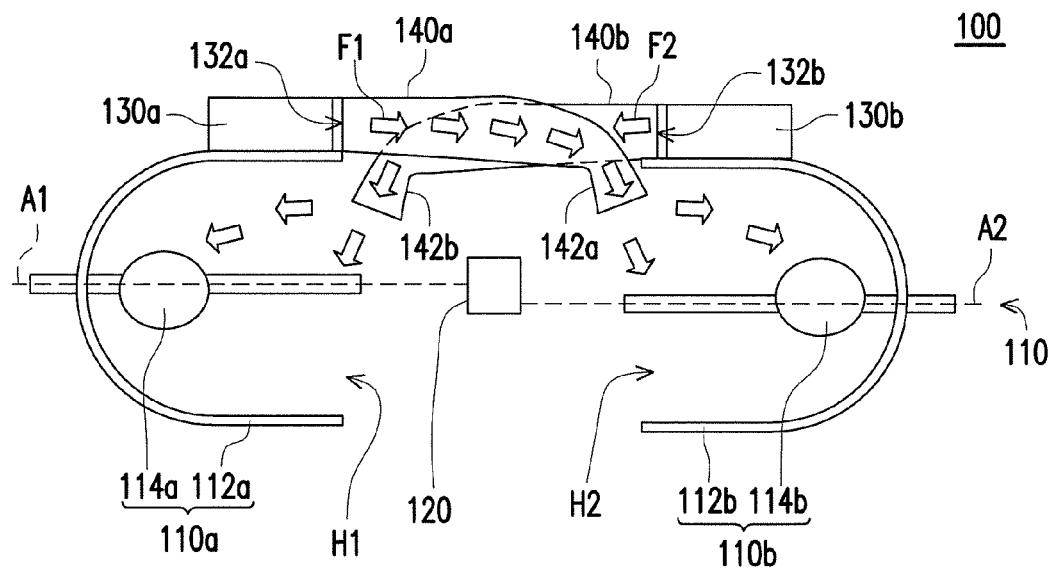
FIG. 1 is a side view of a light source module according to an embodiment of the invention.
Figure 2:
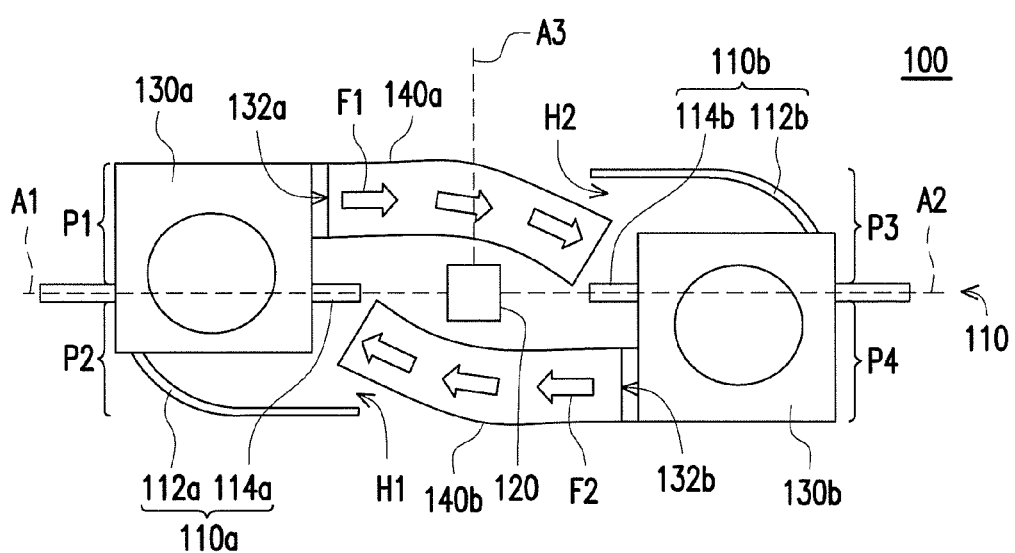
FIG. 2 is a top view of the light source module of FIG. 1.

FIG. 1 is a side view of a light source module according to an embodiment of the invention. FIG. 2 is a top view of the light source module of FIG. 1. Referring to FIG. 1 and FIG. 2, the light source module 100 of the embodiment is adapted to a projector, and is used for providing light beams required by images projected by the projector. The light source module 100 includes a light source 110 and a light combining system 120, the light source 110 includes a first light emitting device 110a and a second light emitting device 110b. The light combining system 120 is disposed between the first light emitting device 110a and the second light emitting device 110b, and combines the light emitted by the first light emitting device 110a and the light emitted by the second light emitting device 110b. The light combining system 120 includes at least one light combining prism. In other embodiments, the light combining system 120 may include other suitable light combining elements, for example, a beam splitter, relay lenses, a light condensing lens, etc., however, the invention is not limited thereto.

The light source module 100 further includes a first cooling fan 130a, a second cooling fan 130b, a first guide duct 140a and a second guide duct 140b. The first cooling fan 130a is disposed on the first light emitting device 110a, and the second cooling fan 130b is disposed on the second light emitting device 110b. The first guide duct 140a is connected to the first cooling fan 130a and guides a cooling airflow F1 provided by the first cooling fan 130a to the second light emitting device 110b, and the second guide duct 140b is connected to the second cooling fan 130b and guides a cooling airflow F2 provided by the second cooling fan 130b to the first light emitting device 110a. In the embodiment, the first guide duct 140a has a first bending section 142a bending towards the second light emitting device 110b, and the second guide duct 140b has a second bending section 142b bending towards the first light emitting device 110a. The first cooling fan 130a and the second cooling fan 130b are, for example, a sirocco fan, a silent fan, an axial flow fan, or other fans suitable for providing the cooling airflow, however, the invention is not limited thereto.

In case that the first light emitting device 110a and the second light emitting device 110b are disposed opposite to each other as shown in FIG. 1 and FIG. 2, the heat of the second light emitting device 110b is dissipated by the first cooling fan 130a disposed on the first light emitting device 110a, and the heat of the first light emitting device 110a is dissipated by the second cooling fan 130b disposed on the second light emitting device 110b. Thus, the first guide duct 140a can guide the cooling airflow F1 provided by the first cooling fan 130a to the second light emitting device 110b via a smaller bending degree of the first bending section 142a, and the second guide duct 140b can guide the cooling airflow F2 provided by the second cooling fan 130b to the first light emitting device 110a via a smaller bending degree of the second bending section 142b.

In this way, loss of flow rates of the cooling airflow F1 and the cooling airflow F2 due to over bending is decreased, so as to improve heat dissipation capability of the light source module 100. Therefore, it is unnecessary to excessively increase the air output of the first cooling fan 130a and the second cooling fan 130b in order to improve the cooling capability of the light source module 100, so as to avoid excessive noise produced when the first cooling fan 130a and the second cooling fan 130b are working.

For example, bending angles of the first bending section 142a and the second bending section 142b are less than 90 degrees, such that the cooling airflow F1 and the cooling airflow F2 can be more smooth. In other embodiments, the bending angles of the first bending section 142a and the second bending section 142b can be preferred in the range of 25 to 50 degrees or other suitable angle ranges; the invention is not limited thereto.

In the embodiment, a beam emitted by the first light emitting device 110a and a beam emitted by the second light emitting device 110b are respectively transmitted to the light combining system 120 along a first optical axis A1 and a second optical axis A2, and the beam emitted by the first light emitting device 110a and the beam emitted by the second light emitting device 110b are transmitted along a third optical axis A3 (shown in FIG. 2) after combined by the light combining system 120, where the first optical axis A1 and the second optical axis A2 are perpendicular to the third optical axis A3. The first guide duct 140a and the second guide duct 140b are not located on the first optical axis A1, the second optical axis A2 and the third optical axis A3. The beam emitted by the first light emitting device 110a, the beam emitted by the second light emitting device 110b and the beam combined by the light combining system 120 are not blocked by the first guide duct 140a and the second guide block 140b, either. Thus, light emitting of the light source module 100 is not impeded.

Referring to FIG. 2, the first light emitting device 110a has a first portion P1 and a second portion P2, the second light emitting device 110b has a third portion P3 and a fourth portion P4, where the first portion P1 and the second portion P2 are respectively aligned to the third portion P3 and the fourth portion P4, the first optical axis A1 is located between the first portion P1 and the second portion P2, and the second optical axis A2 is located between the third portion P3 and the fourth portion P4. The first cooling fan 130a has a first air outlet 132a, and the second cooling fan 130b has a second air outlet 132b. The first air outlet 132a of the first cooling fan 130a is located on the first portion P1 and is connected to the first guide duct 140a. The second air outlet 132b of the second cooling fan 130b is located on the fourth portion P4 and is connected to the second guide duct 140b. According to such configuration, the first guide duct 140a and the second guide duct 140b are misaligned and are not interfered with each other.

In the embodiment, the first light emitting device 110a is, for example, a high pressure mercury lamp and includes a first lampshade 112a and a first light emitting element 114a. The second light emitting device 110b is, for example, a high pressure mercury lamp and includes a second lampshade 112b and a second light emitting element 114b. The first light emitting element 114a and the second light emitting element 114b are respectively disposed in the first lampshade 112a and the second lampshade 112b. In other embodiments, the first light emitting device 110a and the second light emitting device 110b can be other suitable type of light emitting devices such as light emitting diodes (LEDs), laser light sources, etc., however, the invention is not limited thereto.

In detail, the first lampshade 112a and the second lampshade 112b respectively have a first opening end H1 and a second opening end H2, where the first opening end H1 and the second opening end H2 all face the light combining system 120. The light combining system 120 is located between the first opening end H1 and the second opening end H2, such that the beams emitted by the first light emitting element 114a and the second light emitting element 114b can respectively pass through the first opening end H1 and the second opening end H2 to reach the light combining system 120. Moreover, the first guide duct 140a extends from the first cooling fan 130a to the second opening end H2, and the second guide duct 140b extends from the second cooling fan 130b to the first opening end H1, such that the cooling airflow F1 provided by the first cooling fan 130a and the cooling airflow F2 provided by the second cooling fan 130b are respectively guided by the first guide duct 140a and the second guide duct 140b to dissipate the heat inside the first lampshade 112a and the heat inside the second lampshade 112b. In the embodiment, the first cooling fan 130a is disposed at a side of the first lampshade 112a, and the second cooling fan 130b is disposed at a side of the second lampshade 112b, however, the first cooling fan 130a and the second cooling fan 130b can be respectively assembled with the first light emitting device 110a and the second light emitting device 110b through other components according to space configuration requirements, the invention is not limited thereto.

Figure 3:
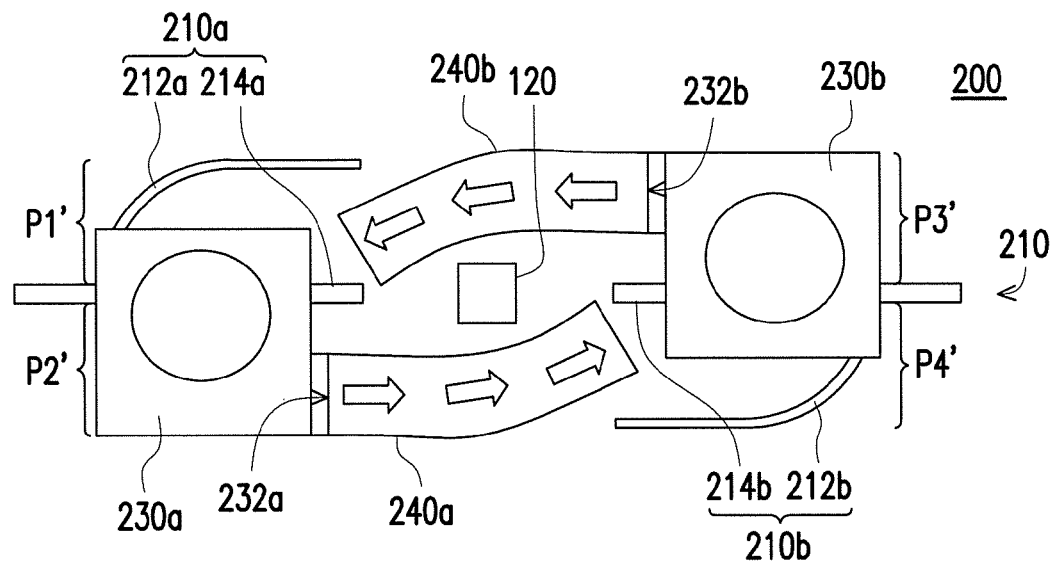
FIG. 3 is a top view of a light source module according to another embodiment of the invention.

FIG. 3 is a top view of a light source module according to another embodiment of the invention. In the light source module 200 of FIG. 3, configurations and functions of a light source 210, a first light emitting device 210a, a first lampshade 212a, a first light emitting element 214a, a second light emitting device 210b, a second lampshade 212b, a second light emitting element 214b, a light combining system 220, a first guide duct 240a and a second guide duct 240b are similar to configurations and functions of the light source 110, the first light emitting device 110a, the first lampshade 112a, the first light emitting element 114a, the second light emitting device 110b, the second lampshade 112b, the second light emitting element 114b, the light combining system 120, the first guide duct 140a and the second guide duct 140b, and details thereof are not repeated.

The differences between the light source module 200 and the light source module 100 is that the position of the first cooling fan 230a is different to the position of the first cooling fan 130a, such that an air outlet 232a of the first cooling fan 230a is located at a second portion P2' of the first light emitting device 210a other than a first portion P1' of the first light emitting device 210a, and the position of the second cooling fan 230b is different to the position of the second cooling fan 130b, such that an air outlet 232b of the first cooling fan 230b is located at a third portion P3' of the second light emitting device 210b other than a fourth portion P4' of the second light emitting device 210b. According to the above configuration, the first guide duct 240a and the second guide duct 240b are misaligned and are not interfered with each other. In other embodiments, the position of the first cooling fan 230a on the first light emitting device 210a and the position of the second cooling fan 230b on the second light emitting device 210b can be changed according to actual requirements; the invention is not limited thereto.

Figure 4:
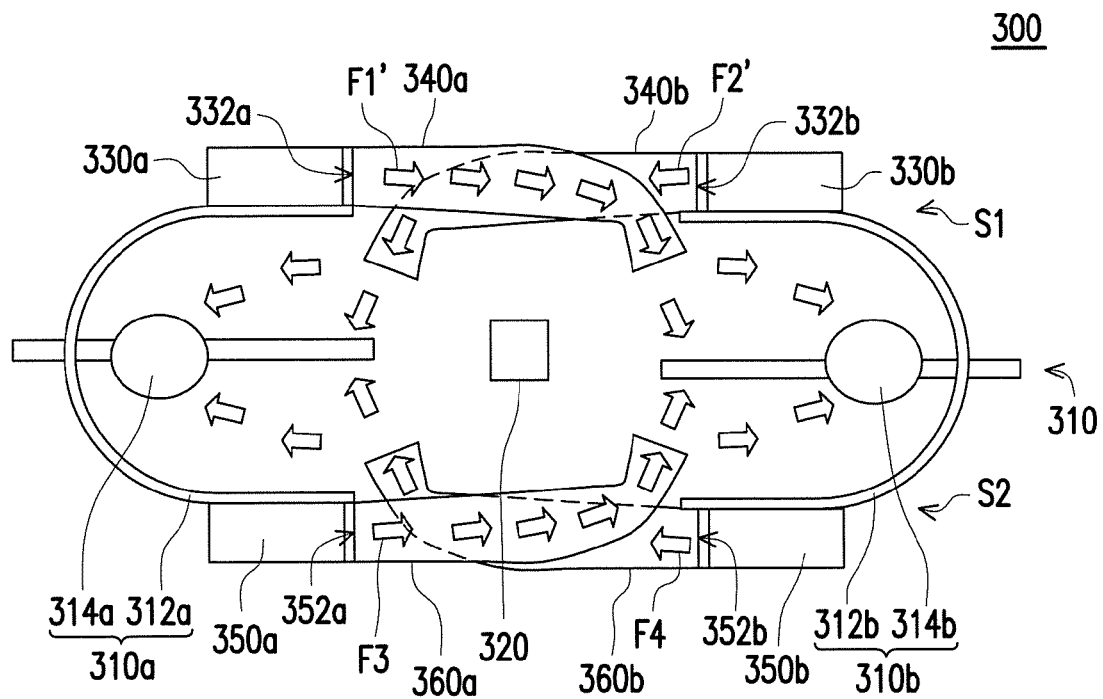
FIG. 4 is a side view of a light source module according to still another embodiment of the invention.

It should be notice that the number of the cooling fans is not limited by the invention, which is described below with reference of FIG. 4. FIG. 4 is a side view of a light source module according to still another embodiment of the invention. In the light source module 300 of FIG. 4, configurations and functions of a light source 310, a first light emitting device 310a, a first lampshade 312a, a first light emitting element 314a, a second light emitting device 310b, a second lampshade 312b, a second light emitting element 314b, a light combining system 320, a first cooling fan 330a, a first air outlet 332a, a second cooling fan 330b, a second air outlet 332b, a first guide duct 340a, a second guide duct 340b, a cooling airflow F1' and a cooling airflow FT are similar to configurations and functions of the light source 110, the first light emitting device 110a, the first lampshade 112a, the first light emitting element 114a, the second light emitting device 110b, the second lampshade 112b, the second light emitting element 114b, the light combining system 120, the first cooling fan 130a, the first air outlet 132a, the second cooling fan 130b, the second air outlet 132b, the first guide duct 140a, the second guide duct 140b, the cooling airflow F1 and the cooling airflow F2, and details thereof are not repeated.

The differences between the light source module 300 and the light source module 100 is that the light source module 300 further includes a third cooling fan 350a, a fourth cooling fan 350b, a third guide duct 360a and a fourth guide duct 360b. The first cooling fan 330a and the third cooling fan 350a are respectively located at two opposite sides of the first light emitting device 310a, and the second cooling fan 330b and the fourth cooling fan 350b are respectively located at two opposite sides of the second light emitting device 310b. The third guide duct 360a is connected to the third cooling fan 350a and guides a cooling airflow F3 provided by the third cooling fan 350a to the second light emitting device 310a, and the fourth guide duct 360b is connected to the fourth cooling fan 350b and guides a cooling airflow F4 provided by the fourth cooling fan 350b to the first light emitting device 310b.

According to the above description, in the light source module 300 of the embodiment, besides that the first cooling fan 330a, the second cooling fan 330b, the first guide duct 340a and the second guide duct 340b are disposed at a top side S1 of the light source 310 for providing cooling airflows to blow upper sections of the first light emitting device 310a and the second light emitting device 310b, the third cooling fan 350a, the fourth cooling fan 350b, the third guide duct 360a and the fourth guide duct 360b are further disposed at a bottom side S2 of the light source 310 for providing cooling airflows to blow lower sections of the first light emitting device 310a and the second light emitting device 310b, where the top side and the bottom side of the light source, the upper sections and lower sections of the light emitting devices are defined according to gravity direction. Configurations and functions of the third cooling fan 350a and the third air outlet 352a thereof, the fourth cooling fan 350b and the fourth air outlet 352b thereof, the third guide duct 360a and the fourth guide duct 360b are similar to configurations and functions of the first cooling fan 330a and the first air outlet 332a thereof, the second cooling fan 330b and the second air outlet 332b thereof, the first guide duct 340a and the second guide duct 340b, by which heat dissipation efficiency of the light source module 300 is further improved.

According to the above description, in case that the upper sections of the first light emitting element 314a and the second light emitting element 314b have higher temperature due to rising of hot air, the air output of the first cooling fan 330a and the second cooling fan 330b located at the top side S1 of the light source 310 can be set to be greater than the air output of the third cooling fan 350a and the fourth cooling fan 350b located at the bottom side S2 of the light source 310, so as to improve the heat dissipation efficiency at the upper sections above the first light emitting element 314a and the second light emitting element 314b. In other embodiments, the air output of the first cooling fan 330a, the second cooling fan 330b, the third cooling fan 350a and the fourth cooling fan 350b can be adjusted according to an actual orientation of the light source module 300, so as to evenly dissipate heat of peripheral areas of the first light emitting element 314a and the second light emitting element 314b.

In summary, the embodiments of the invention have at least one of the following advantages. In the embodiments of the invention, the first cooling fan is disposed on the first light emitting device and the first cooling fan is used to dissipate heat of the second light emitting device, and the second cooling fan is disposed on the second light emitting device and the second cooling fan is used to dissipate heat of the first light emitting device. In this way, in case that the first light emitting device and the second light emitting device are disposed opposite to each other, the first guide duct connected to the first cooling fan is capable of guiding the cooling airflow provided by the first cooling fan to the second light emitting device via a relatively small bending degree, and the second guide duct connected to the second cooling fan is capable of guiding the cooling airflow provided by the second cooling fan to the first light emitting device via a relatively small bending degree. Thus, loss of a flow rate of the cooling airflow due to over bending is avoided, so as to improve heat dissipation capability of the light source module. In this way, it is unnecessary to excessively increase the air output of the first cooling fan and the second cooling fan in order to improve the heat dissipation capability of the light source module, so as to avoid excessive noise produced when the first cooling fan and the second cooling fan are working.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first," "second," etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims.

What is claimed is:

1. A light source module, adapted to a projector, comprising:
   a light source, comprising a first light emitting device and a second light emitting device;
   a light combining system, disposed between the first light emitting device and the second light emitting device;
   a first cooling fan, disposed at a side of the first light emitting device;
   a second cooling fan, disposed at a side of the second light emitting device;
   a first guide duct, connected to the first cooling fan, and guiding a cooling airflow provided by the first cooling fan to the second light emitting device; and a second guide duct, connected to the second cooling fan, and guiding a cooling airflow provided by the second cooling fan to the first light emitting device.

2. The light source module as claimed in claim 1, wherein a beam emitted by the first light emitting device and a beam emitted by the second light emitting device are respectively transmitted to the light combining system along a first optical axis and a second optical axis.

3. The light source module as claimed in claim 2, wherein the first light emitting device has a first portion and a second portion, the second light emitting device has a third portion and a fourth portion, the first portion and the second portion are respectively aligned to the third portion and the fourth portion, the first optical axis is located between the first portion and the second portion, the second optical axis is located between the third portion and the fourth portion, the first cooling fan has a first air outlet, the second cooling fan has a second air outlet, the first air outlet is located at the first portion and is connected to the first guide duct, and the second air outlet is located at the fourth portion and is connected to the second guide duct.

4. The light source module as claimed in claim 2, wherein the beam emitted by the first light emitting device and the beam emitted by the second light emitting device are transmitted along a third optical axis after passing through the light combining system, and the first optical axis and the second optical axis are perpendicular to the third optical axis.

5. The light source module as claimed in claim 1, wherein the first guide duct has a first bending section bending towards the second light emitting device, the second guide duct has a second bending section bending towards the first light emitting deice, a bending angle of the first bending section is not greater than 90 degrees, and a bending angle of the second bending section is not greater than 90 degrees.

6. The light source module as claimed in claim 1, further comprising a third cooling fan and a fourth cooling fan, the first cooling fan and the third cooling fan are respectively disposed at two opposite sides of the first light emitting device, and the second cooling fan and the fourth cooling fan are respectively disposed at two opposite sides of the second light emitting device.

7. The light source module as claimed in claim 6, further comprising a third guide duct and a fourth guide duct, the third guide duct is connected to the third cooling fan and guides a cooling airflow provided by the third cooling fan to the second light emitting device, and the fourth guide duct is connected to the fourth cooling fan and guides a cooling airflow provided by the fourth cooling fan to the first light emitting device.

8. The light source module as claimed in claim 7, wherein the light source has a top side and a bottom side opposite to each other, the first cooling fan and the second cooling fan are located at the top side, the third cooling fan and the fourth cooling fan are located at the bottom side, and an air output of the first cooling fan and the second cooling fan is greater than an air output of the third cooling fan and the fourth cooling fan.

9. The light source module as claimed in claim 1, wherein the first light emitting device comprises a first lampshade and a first light emitting element, the second light emitting device comprises a second lampshade and a second light emitting element, the first light emitting element and the second light emitting element are respectively disposed in the first lampshade and the second lampshade, the first lampshade and the second lampshade respectively have a first opening end and a second opening end, the first opening end faces the second opening end, the first guide duct extends form the first cooling fan towards the second opening end, and the second guide duct extends from the second cooling fan towards the first opening end.

10. The light source module as claimed in claim 9, wherein the first cooling fan is disposed at a side of the first lampshade, and the second cooling fan is disposed at a side of the second lampshade.

\* \* \* \* \*